Sept. 11, 1951     F. F. LIETZ     2,567,384
AUTOMOTIVE VEHICLE RADIATOR AND
GAS TANK HANDLING APPARATUS Filed Sept. 23, 1948     3 Sheets-Sheet 1

Inventor:
Fredrick F. Lietz
By Wallace and Cannon
Attorney

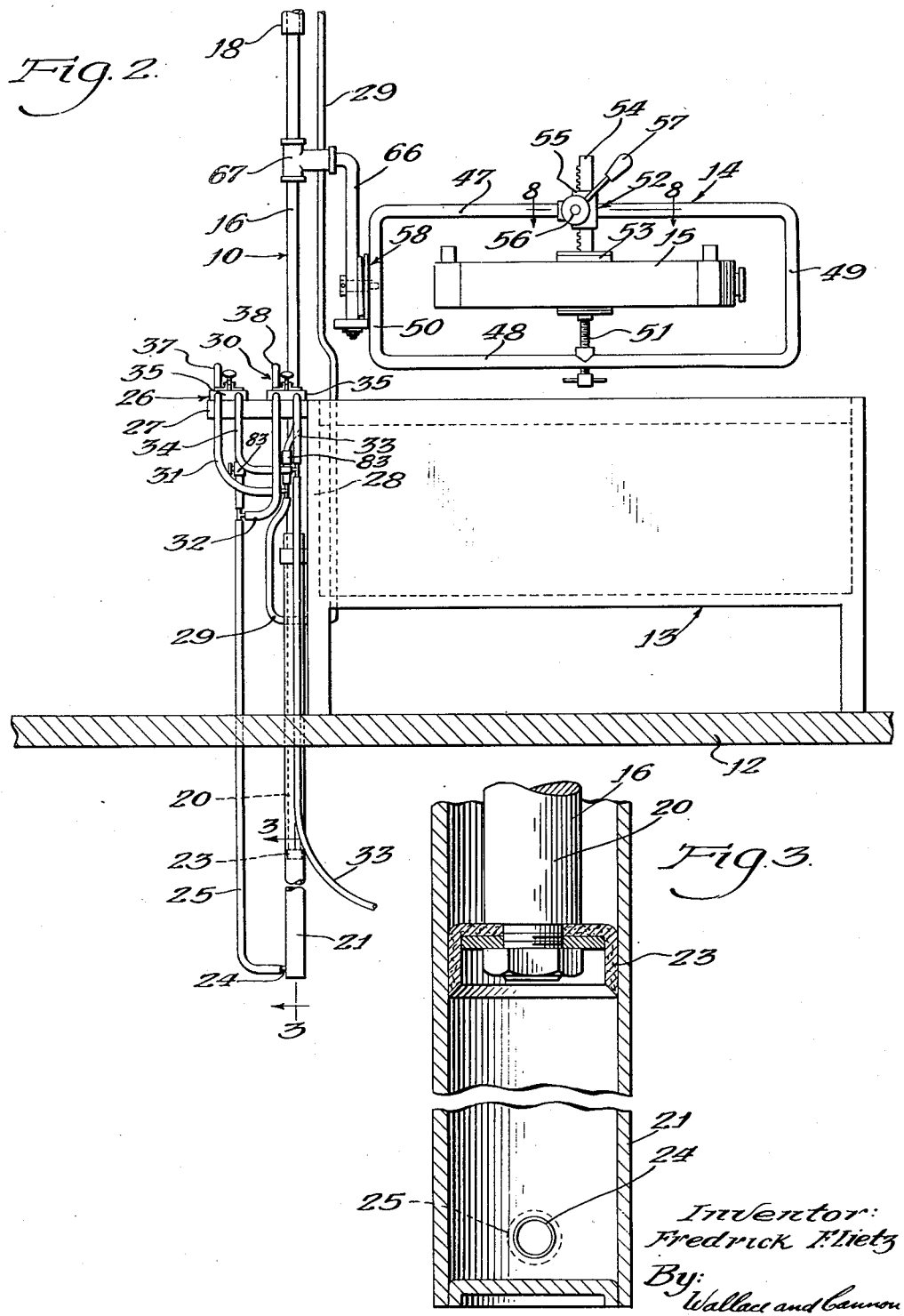

Sept. 11, 1951 F. F. LIETZ 2,567,384
AUTOMOTIVE VEHICLE RADIATOR AND
GAS TANK HANDLING APPARATUS
Filed Sept. 23, 1948 3 Sheets-Sheet 3
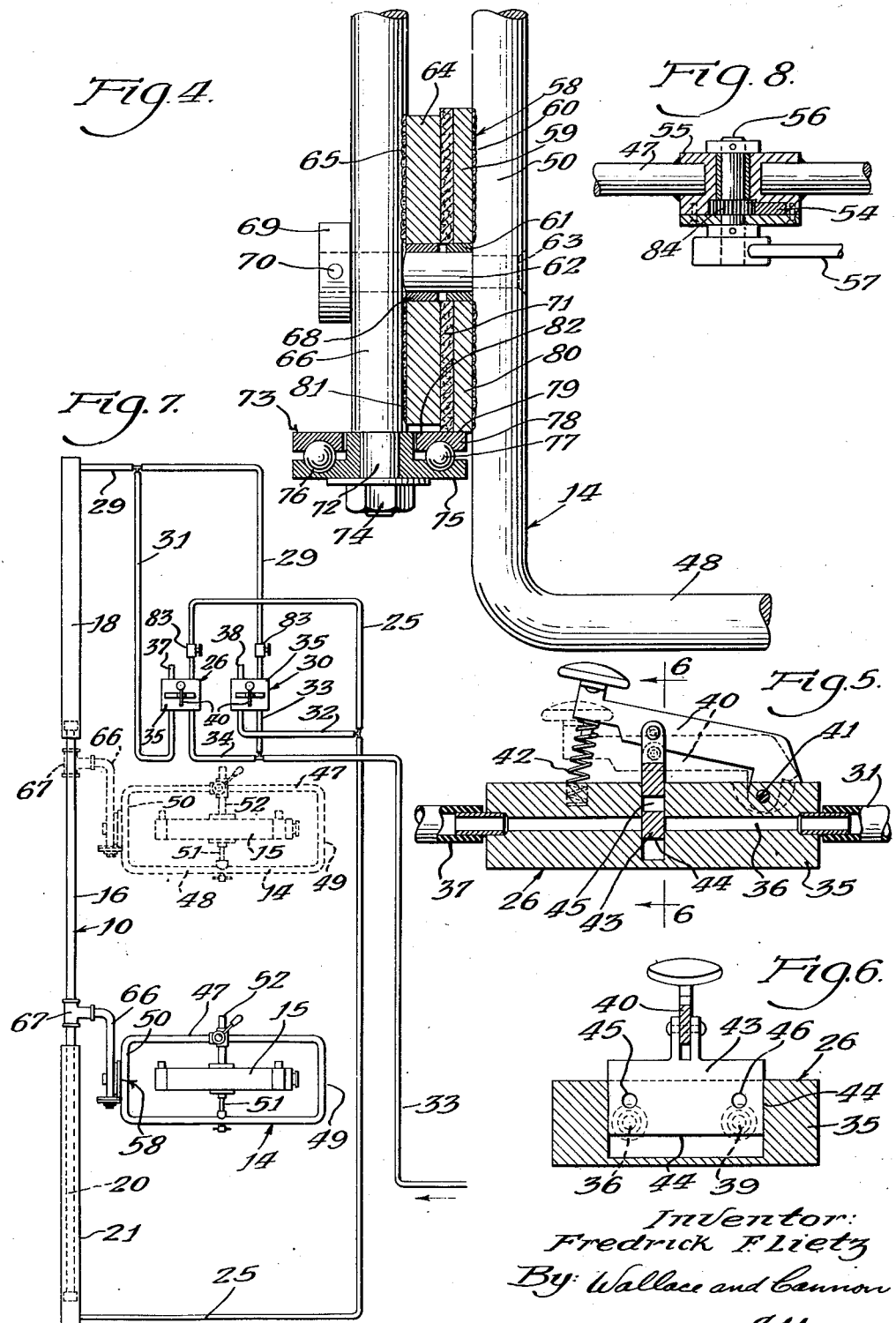
Inventor:
Fredrick F Lietz
By: Wallace and Cannon
Attorneys Patented Sept. 11, 1951

2,567,384

UNITED STATES PATENT OFFICE 2,567,384

AUTOMOTIVE VEHICLE RADIATOR AND GAS TANK HANDLING APPARATUS

Fredrick F. Lietz, Appleton, Wis.

Application September 23, 1948, Serial No. 50,813

5 Claims. (Cl. 29—290)

1

This invention relates to an apparatus for use in handling automotive vehicle radiators and gas tanks, including those used on passenger cars, trucks, and tractors, in connection with soldering and other repairs thereon.

Heretofore in the art of soldering and otherwise repairing automotive vehicle radiators and gas tanks it has been customary practice manually to submerge such radiators and gas tanks in a tank filled with water for the purpose of locating leaks therein before the necessary repairs are made and for the purpose of ascertaining, after the repair operation, whether or not the leaks have been fully and properly repaired. However, such automotive vehicle radiators and gas tanks are relatively heavy objects and this is particularly true as to automotive truck and tractor radiators which may weigh as much as 400 pounds or more. Hence it will be appreciated that a considerable problem has been involved in handling such heavy objects.

Accordingly, an object of the present invention is to provide a novel and relatively simple and inexpensive pneumatically-operated apparatus for lifting automotive vehicle radiators and gas tanks into, and for submerging them, and for raising them from, a tank of water for the purpose of locating leaks therein prior to making repairs thereon and for the purpose of checking, after the soldering or like repairing operation, to determine whether or not such leaks have been fully and properly made.

Another object of the invention is to provide in the new automotive vehicle radiator and gas tank handling apparatus a novel construction for enabling an automotive vehicle radiator or gas tank to be readily manipulated in both a vertical plane and a horizontal plane over and relative to a tank of water in which the radiator or gas tank is to be submerged for the purpose of locating leaks therein before and after the soldering or like repairing operation.

An additional object of the invention is to provide in the new automotive vehicle radiator and gas tank handling apparatus a novel manually operable supporting frame having a pair of manually adjustable clamping devices mounted thereon for clamping a radiator or gas tank upon the said supporting frame and for holding it in either a horizontal or a vertical position above and relative to the water tank in which the radiator or gas tank is to be submerged.

A further object of the invention is to provide a novel and relatively simple and inexpensive pneumatically-operated apparatus for lifting an automotive vehicle radiator or gas tank into position over, and for submerging it in a tank of water, for the purpose of locating leaks therein, and which may readily be installed in repair shops in which such repairs are made by skilled mechanics specializing in this work.

An additional object of the invention is to provide in the new automotive vehicle radiator and gas tank handling apparatus a novel manually operable air control valve assembly by means of which the operator of the apparatus is enabled easily and readily to control the movement of air in the pneumatic system embodied in the new apparatus and the movement of the pneumatically-operated piston which is embodied therein.

Another object of the invention is to provide in the new automotive vehicle radiator and gas tank handling apparatus a novel device for normally holding the supporting frame and the manually adjustable clamping devices mounted thereon in a pre-selected position relative to and against turning or rotary movement in a vertical plane upon and relative to the pneumatically-operated piston on which the said supporting frame and the said manually adjustable clamping devices thereon are rotatably mounted.

Other and further objects of the present invention will be apparent from the following description and claims and are illustrated in the accompanying drawings which, by way of illustration, show a preferred embodiment of the invention and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a perspective view illustrating a typical embodiment of the new automotive vehicle radiator and gas tank handling device installed in position of use adjacent a water tank, which is shown as being mounted on the floor of a repair shop, and showing an automotive vehicle radiator clamped in upright position upon the floor of the repair shop adjacent the water tank into which the automotive vehicle radiator, or an automotive vehicle gas tank, may be submerged for the purpose of locating leaks therein before and after the repairing operation.

Fig. 2 is a side elevational view, partly in section, as seen from the right hand side in Fig. 1;

Fig. 3 is an enlarged fragmentary sectional detail view, on line 3—3 in Fig. 2, illustrating the construction of one of the air cylinders which are embodied in the new apparatus and the construction of the pneumatically operated piston which is slidably mounted therein;

Figure 1:
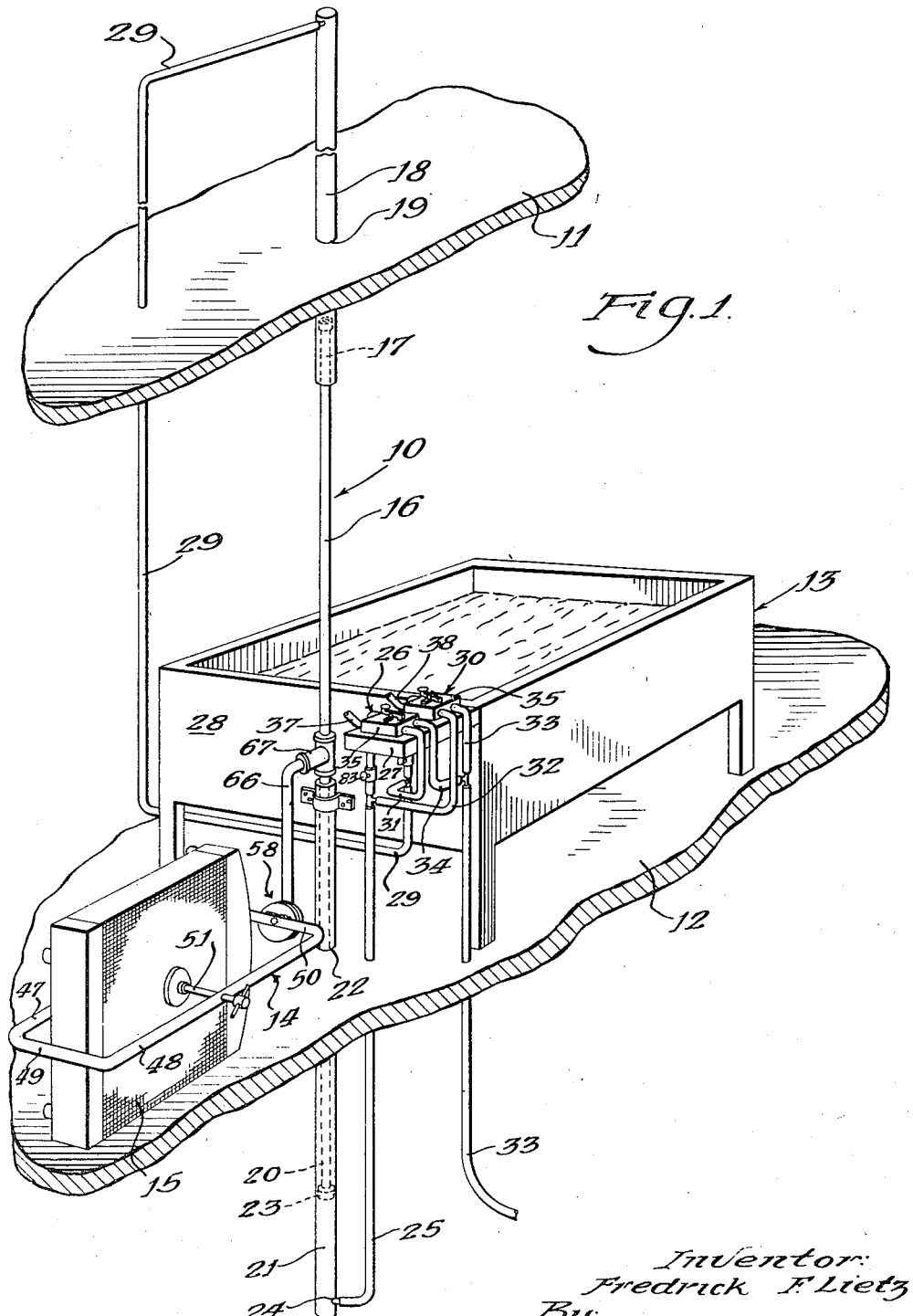

Fig. 4 is an enlarged view, partly in section and partly in elevation, illustrating the construction of the anti-friction mounting of the supporting frame, upon which an automotive vehicle radiator or gas tank is adapted to be mounted, and illustrating the construction of a friction clutch which is embodied in the new automotive vehicle radiator and gas tank handling apparatus for the purpose of frictionally but releasably holding the manually operable supporting frame in a preselected position and against turning movement upon and relative to the pneumatically-operated piston upon which the said supporting frame and the manually operable clamping devices carried thereby are mounted;

Fig. 5 is an enlarged sectional detail view illustrating the construction of one of the manually operable air control valve devices which are embodied in the new automotive vehicle radiator and gas tank handling apparatus for controlling the flow of air under pressure into and out of the air cylinders in which the pneumatically-operated piston works so as to control the vertical or up and down movement of the pneumatically-operated piston and the supporting frame and the manually adjustable clamping devices carried thereby;

Fig. 6 is a transverse central vertical sectional view on line 6—6 in Fig. 5;

Fig. 7 is a diagrammatic view illustrating the arrangement of the air cylinders, the pneumatically-operated piston, the air control valve devices, the supporting frame and the manually adjustable clamping devices thereon, and other parts which are embodied in the new automotive vehicle radiator and gas tank handling apparatus; and Fig. 8 is a sectional plan detail view on line 8—8 in Fig. 2.

A typical embodiment of the new automotive vehicle radiator and gas tank handling apparatus is illustrated in the drawings, wherein it is generally indicated at 10, and is shown, for the purpose of illustration, as being mounted in position of use in a repair shop in which soldering and other repairs may be done upon such automotive vehicle radiators and gas tanks. The ceiling of the repair shop is indicated at 11 and the floor thereof is indicated at 12, and a water tank 13 is shown as resting on the floor 12 of the repair shop adjacent the new automotive vehicle radiator and gas tank handling apparatus 10. The water tank 13 is adapted to have submerged therein an automotive vehicle radiator or gas tank for the purpose of locating leaks therein both before and after soldering and other repairs have been made thereon.

The new automotive vehicle radiator and gas tank handling apparatus embodies a supporting frame, which is generally indicated at 14, and which is adapted to support and to have clamped thereon an automotive vehicle radiator 15, (or an automotive vehicle gas tank). The supporting frame 14 is mounted on and is carried by a vertically movable pneumatically-operated piston 16 which is vertically movable or slidable between the ceiling 11 and floor 12 of the repair shop. To this end the upper end portion 17 of the pneumatically-operated piston 16 is slidably mounted in an upper air cylinder 18 which is mounted in the repair shop in such a manner that it projects through an opening 19 in the ceiling 11 with the upper end portion of the upper air cylinder 18 projecting into that area of the repair shop which is disposed above the ceiling 11 thereof. Similarly, the lower end portion 20 of the pneumatically-operated piston 16 is slidably mounted in a lower air cylinder 21 which extends through an opening 22 in the floor 12 of the repair shop so that a portion of the lower air cylinder 21 is disposed above, and so that a portion thereof is disposed below, the floor 12 of the repair shop (Fig. 1).

As shown in Fig. 3 of the drawings, the lower end portion 20 of the pneumatically-operated piston 16 has a suitable flexible leather, rubber or fabric packing and sealing element 23 mounted thereon which is adapted to have air sealing and wiping engagement with the inner surface of the lower air cylinder 21, and a similar arrangement is provided on the upper end portion of the pneumatically-operated piston 16.

The lower end portion of the lower air cylinder 21 has an air inlet and outlet opening 24 therein for the admission and escape of air and a similar opening is provided in the upper end portion of the upper air cylinder 18.

An air pressure supply line or pipe 25 is connected to the air inlet and outlet 24 in the lower end portion of the lower air cylinder 21 and this air pressure supply line or pipe 25 leads upwardly to a manually operable air control valve device, which is generally indicated at 26, and which is mounted on a horizontally extending supporting platform 27 which is attached to one end wall 28 of the water tank 13. Similarly, the upper end portion of the upper air cylinder 18 has an air inlet and outlet opening therein (not shown) and an air pressure supply line or pipe 29 is connected to the upper end portion of the upper air cylinder 18.

The lower end portion of the air pressure supply line or pipe 29 is connected to a manually operable air control valve device 30 which is mounted on the supporting platform 27 adjacent the air control valve device 26. An air bleed or pressure relief line or pipe 31 leads from the air pressure supply line or pipe 29 for the upper air cylinder 18 to the manually operable air control valve device 26, and an air bleed or pressure relief line or pipe 32 leads from the air pressure supply line or pipe 25 for the lower air cylinder 21 to the other manually operable air control valve device 30.

An air pressure supply line 33 is connected to the manually operable air control valve device 30 and this air pressure supply line 33 is connected, by way of a branch line 34, to the manually operable air control valve device 26. The air pressure supply line 33 is adapted to be connected to a tank of compressed air (not shown), or like a source of air under suitable pressure, such, for example, as 100 pounds per square inch.

The manually operable air control valve devices 26 and 30 are similar in construction and hence the construction of only one of the same will now be described, namely, the manually operable air control valve device 26, which is shown in detail on Figs. 5 and 6 of the drawings.

As shown in Figs. 1, 2, 5, 6 and 7 of the drawings, each of the manually operable air control valve devices 26 and 30 includes a valve body or block 35 which may be made of any suitable metal and which is mounted on the horizontal support 27 which is attached to one end wall 28 of the water tank 13 so as to facilitate access to and handling of the manually operable air control valve devices 26 and 30 while the operator is standing alongside the water tank 13 in a position to submerge an automotive vehicle radiator or gas tank in the water tank 13. Each of the valve blocks 35 has a pair of spaced parallel air passages formed therein. Thus, the valve block 35 which is embodied in the manually operable air control valve device 26 has an air passage 36 formed therein and one end portion of this air passage 36 is connected to the air bleed or pressure relief line 31 and the other end of this air passage 36 is connected to an air bleed or pressure relief outlet 37 (Fig. 5) which opens to the atmosphere. Similarly, the other valve block 35 which is embodied in the other manually operated air control valve device 30 has an air bleed or pressure relief outlet 38 connected thereto (Fig. 7).

As shown in Fig. 6, the valve block 35 which is embodied in the manually operated air control valve device 26 has a second air passage 39 formed therein and extending therethrough parallel to the air passage 36. One end of this air passage 39 is connected to the air pressure supply line 34—33 and the other end of the air passage 39 is connected to the air pressure supply line 25 for the lower air cylinder 21 (Fig. 7).

Each of the manually operated air control valve devices 26 and 30 embodies a manually operable valve control handle member or lever 40 which is pivotally mounted at one end, as at 41, upon the corresponding valve block 35. Each of these manually operable valve control handle members 40 is normally urged upwardly by a coil spring 42 (Fig. 5) which is arranged between the outer or free end portion of the valve control handle member or lever 40 and the corresponding block 35 disposed therebelow. A slidable valve plate 43 is attached to each valve control handle member or lever 40 and each of these slidable valve plates 43 works in a vertically extending slot 44 which is formed in the corresponding valve block 35 (Figs. 5 and 6). The slidable valve plate 43 which is embodied in the manually operable air control valve device 26 has a pair of spaced valve openings or ports 45 and 46 formed therein which are normally disposed out of registry with, and which normally close, the air passages 36 and 39 in the corresponding valve block 35. However, the valve openings or ports 45 and 46 are adapted to be moved into registry with the air passages 36 and 39, respectively, in the corresponding valve block 35, by manually depressing the pivoted handle member or lever 40 and the slidable valve plate 43, against the action of the spring 42. The handle member or lever 40 for the other manually operable air control valve device 30, and the parts associated therewith, are similarly constructed and operated.

A check valve 83, of any suitable design and construction, is arranged in the air supply line 25 to the lower air cylinder 21, adjacent the outlet side of the manually operable air control valve device 26, and a similar check valve 83, of any suitable design and construction, is arranged in the air supply line 29 to the upper air cylinder 18, adjacent the outlet side of the manually operable air control device 30 (Figs. 1, 2 and 7).

The supporting frame 14 for the new automotive vehicle radiator and gas tank handling apparatus includes spaced parallel top and bottom rails 47 and 48, respectively, and spaced parallel end rails 49 and 50, all of which are formed into a unitary and substantially rectangular structure upon which an automotive vehicle radiator 15, or an automotive vehicle gas tank, may be supported. To this end, lower horizontal rail 48 of the supporting frame 14 has a manually operable clamping device, in the form of a screw clamp 51, threadedly and adjustably mounted therein and the upper horizontal rail 47 has a manually operable and adjustable clamping device 52 mounted thereon. The clamping device 52 includes a clamping plate or disc 53 which is carried by a vertically movable rack bar 54 which is slidably mounted in a guide 55 which is attached to the top horizontal rail 47 of the supporting frame 14. A pinion gear shaft 56 is rotatably mounted in the guide member 55 and a pinion gear 84 on the shaft 56 engages with the rack bar 54. The pinion gear shaft 56 has a handle 57 attached thereto.

The new automotive vehicle radiator and gas tank handling apparatus also includes a friction clutch device 58 which is adapted to hold the supporting frame 14, and the radiator 15, or gas tank, clamped therein, in a preselected position and against turning movement upon and relative to the pneumatically-operated piston 16 on which the supporting frame 14 and the adjustable clamping devices 51 and 52 carried thereby, are mounted.

To this end, the friction clutch device 58 includes a hard steel disc-shaped plate 59 which is welded or otherwise fastened, as at 60, to the vertically extending end rail 50 of the supporting frame 14. A bushing 61 is mounted centrally in the plate 59 and this bushing 61 is mounted on a shaft 62 which has an end portion fastened, as at 63, in the vertically extending end rail 50 of the supporting frame 14. The friction clutch device 58 also includes a second hard steel disc-shaped plate 64 which is fastened, as at 65, by welding or the like, to a vertically extending arm 66 which is attached, by means of a T-shaped connection 67, to the movable air piston 16, between the ends of the latter, and between the upper and lower air cylinders 18 and 21.

The plate 64 has a bushing 68 mounted centrally thereof and this bushing 68 is mounted on the shaft 62. A collar 69 is mounted on the shaft 62 and is attached thereto, as at 70, at one side of the depending arm 66, as shown in Fig. 4 of the drawings. A friction element in the form of a friction disc 71, which may be of any suitable clutch facing friction material such, for example, as phenolic-aldehyde resin-bonded asbestos, 71 is mounted on the disc-shaped hard steel plate 59, on the inner surface thereof. The friction element or clutch facing 59 has frictional engagement with the inner surface of the disc-shaped steel plate 64 and this frictional engagement is such as to retain the supporting frame 14 and the adjustable clamping devices 51 and 52 mounted thereon, and an automotive vehicle radiator 15 clamped thereby, against free turning movement or rotation upon and relative to the depending supporting arm 66 of the pneumatically-operated piston 16.

The supporting arm 66 has a reduced lower end portion 72 on which an anti-friction bearing assembly 73 is mounted, the anti-friction bearing assembly 73 being retained upon the lower end portion of the arm 66 by means of a nut 74 which is threaded onto a threaded lower end portion of the supporting arm 66. The anti-friction bearing assembly 73 includes a lower ball race 75 which is provided with an annular groove 76 in which the plurality of anti-friction ball bearings 77 are mounted. The anti-friction bearing assembly 73 also includes an upper race or ring 78 having an annular groove 79 formed in its lower surface so that it may ride upon and freely rotate upon the anti-friction bearing balls 77.

As shown in Fig. 4 of the drawings, the lower end portion 80 of the steel disc or plate 59 rides upon the upper surface of the upper ball race or ring 78, whereas the lower end portion 81 of the disc 64 is spaced slightly above the upper ball race or ring 78, as indicated at 82 (Fig. 4).

The use and operation of the new automotive vehicle radiator and gas tank handling apparatus are as follows: The air pressure supply line 33 may be connected to a suitable source of air under a suitable pressure such, for example, as 100 pounds per square inch, whereupon air under pressure will flow through the air supply line 33 into air passages 36 and 39 in the valve block 35 which is embodied in the air control valve device 26, (Figs. 5 and 6) and into corresponding air passages in the similar valve block 35 which is embodied in the manually operable air control valve device 30.

When not in use the supporting frame 14 may be disposed in a position above the water tank 13 so as to be out of the way relative to the floor area 12 of the repair shop in which the new apparatus is used. In order to lower the pneumatically-operated piston 16 and the supporting frame 14 carried thereby into a position, as in Fig. 1, to enable a radiator 15 or gas tank to be clamped within the supporting frame 14 and between the manually operable and adjustable clamping devices 51 and 52, the operator may manually grasp the supporting frame 14 and rotate the same, together with the pneumatically-operated piston 16, relative to the upper and lower air cylinders 18 to 21, respectively, so as to rotate the supporting frame 14 from a position above the water tank 13 into a position at one side or end thereof, as in Fig. 1. During this operation the upper and lower end portions of the pneumatically-operated piston 16 will rotate in and relative to the stationary upper and lower cylinders 18 and 21, respectively.

In order to lower the supporting frame 14 and the pneumatically-operated piston 16 into a position to enable the radiator 15 to be clamped between the manually operable and adjustable clamping devices 51 and 52 the operator may manipulate the air control valve handle member or lever 40 which is embodied in the manually operable air control valve device 30 so as to open the air passages in the valve block 35 which is embodied in the manually operable air control valve device 30. Air under pressure will then flow through the air supply line 33, through the corresponding passage in the valve block 35 which is embodied in the manually operable air control valve device 30, through the air line 29, through the check valve 83 in the air line 29, into the upper area of the upper air cylinder 18 so as to apply air pressure upon the upper end portion of the movable pneumatically-operated piston 16 and thereby to force the piston 16 and the supporting frame 14 carried thereby downwardly to a position above the floor 12 of the repair shop, with the supporting frame 14 encircling the upright radiator 15 and in position such that the manually-operable and adjustable clamping devices 51 and 52 may be manipulated to clamp the radiator 15 in position therebetween.

When the manually operable air control valve handle member or lever 40, which is embodied in the manually operable air control valve device 30 is depressed, to open the air line 33—35—30—29 to the upper area of the upper air cylinder 18, the same manipulation of the manually operable valve handle member or lever 40, which is embodied in the manually operable air control valve device 30, opens the other passage in the valve block 35, which is embodied in the valve device 30, to enable air to be bled from the lower air cylinder 21 by way of the line 25—32—35—30—38 to the atmosphere, during the time that air under pressure is being forced into the upper area of the upper air cylinder 18 to move the pneumatically-operated piston 16 and the supporting frame 14 carried thereby downwardly.

An automotive vehicle radiator 15 or an automotive vehicle gas tank, which is to undergo repairs, may be disposed upon the floor 12 of a repair shop, adjacent the water tank 13, and may be manually raised into upright position upon the floor 12. The operator of the new automotive vehicle radiator and gas tank handling apparatus may then manipulate the new apparatus in such a manner as to lower the supporting frame 14 into position over the then upright radiator 15 with the supporting frame 14 enclosing or encircling the radiator 15, whereupon the manually operable and adjustable clamping devices 51 and 52 may be manipulated to clamp the radiator 15 between the side rails 47 and 48 and the end rails 49 and 50, respectively, of the supporting frame 14.

The new automotive vehicle radiator and gas tank handling apparatus may then be manipulated in such a manner, as will be described presently, to raise the pneumatically-operated piston 16 and the supporting frame 14, and the adjustable clamping devices 51 and 52 thereon, and the radiator 15 or gas tank held thereby to a height somewhat above the upper level of the water in the tank 13. The pneumatically-operated piston 16 and the supporting frame 14, and the radiator 15 or gas tank held thereby may then be manually rotated upon the pneumatically-operated piston 16 into a position, as shown in Fig. 2, with the supporting frame 14 and the radiator 15 or gas tank held thereby being disposed in position to be submerged in the water tank 13. During this operation of positioning the supporting frame 14 and the radiator 15 or gas tank supported thereby above the water tank 13 the upper and lower end portions of the pneumatically-operated piston 16 rotate in and relative to the upper air cylinder 18 and the lower air cylinder 21, respectively. The manually operable air control valve devices 26 and 30 may then be manipulated to lower the pneumatically-operated air piston 16 and the supporting frame 14 carried thereby and the radiator 15 or gas tank supported thereon so as to submerge the radiator 15 or gas tank in the water tank 13 and thus determine the location of any leaks which may be present therein before and also after soldering or other repair operations have been performed thereon. This submerging operation will be described hereinafter.

In order to raise the pneumatically-operated piston 16, and the supporting frame 14, and the radiator 15 mounted thereon, the manually operable valve handle member or lever 40, which is embodied in the manually operable air control valve device 26, is depressed, against the action of the corresponding spring 42, so as to move the corresponding slidable valve plate 43 into a position to register the valve ports 45 and 46 therein with the air passages 36 and 39 in the valve block 35 which is embodied in the air control valve device 26. Air under pressure will then flow from the air supply line 33, through the branch line 34, through the passage 39 in the valve block 35 which is embodied in the manually operable valve device 26, through the valve port 46 in the corresponding slidable valve plate 43, and thence through the air line 25, and the check valve 83 in the air line 25, into the lower area of the lower air cylinder 21, below the piston 16, which will thereupon be forced upwardly in and relative to the upper and lower air cylinders 18 and 21, respectively.

When the valve handle member or lever 40, which is embodied in the valve device 26, is thus depressed to permit air under pressure to flow into the lower area of the lower air cylinder 21, the valve port 45 in the valve plate 43 which is embodied in the manually operable air control valve device 26, is moved into registry with the passage 36 in the corresponding valve block 35, whereupon air will bleed from the upper area of the upper air cylinder 18 through the line 29—31—35—26—37, to the atmosphere, during the time that air under pressure is being forced into the lower area of the lower air cylinder 21 to raise the pneumatically-operated piston 16 and the supporting frame 14 and the radiator 15 mounted thereon.

When the pneumatically-operated piston 16 and the supporting frame 14 and the radiator 15 mounted thereon have been raised to a height such that the then lower edge of the radiator 15 will clear the top of the water tank 13, manual pressure on the movable valve handle member or lever 40 embodied in the valve device 26 may be released, whereupon the resetting spring 42 will return the movable valve member or lever 40, which is embodied in the valve device 26, and the slidable valve plate 43 carried thereby, to their normal and closed position, as in Figs. 5 and 6. This operation will move the ports 45 and 46 in the movable valve plate 43 out of registry with the passages 36 and 39 in the valve block 35, which is embodied in the valve device 26, thereby cutting off the flow of air into the lower area of the lower cylinder 21 and, at the same time, preventing the bleeding of air from the upper area of the upper air cylinder 18.

The operator may then manually grasp the supporting frame 14 and rotate the supporting frame 14 and the radiator 15 clamped thereon, upon and with the pneumatically-operated piston 16, into a position such as to bring the supporting frame 14 and the radiator 15 over or above the water tank 13. During this operation the supporting frame 14 and the radiator 15 mounted thereon rotates with the pneumatically-operated piston 16 the upper and lower end portions of which, in turn, rotate in the upper and lower air cylinders 18 and 21, respectively.

The operator may then manually grasp the supporting frame 14 and rotate the latter through an arc of 90° so as to bring the radiator 15 clamped thereon into horizontal position, as in Fig. 2, and ready to be submerged in the water tank 13. The operation of submerging the radiator 15, or a gas tank, clamped upon the supporting frame 14, may then be accomplished by again manipulating the movable handle member or lever 40, which is embodied in the valve device 30, so as to enable air to flow from the air supply line 33, through the valve block 35 which is embodied in the valve device 30, and thence through the line 29 into the upper area of the upper air cylinder 18 while, at the same time, allowing air to bleed out of the lower area of the lower air cylinder 21 through the line 25—32—35—30—38 to the atmosphere.

The friction clutch device 58 is so constructed and arranged that frictional engagement of the friction element or friction clutch facing 71, which is carried by the steel disc-shaped plate 59, with the adjacent face of the disc-shaped steel plate 64, is sufficient to prevent free turning or rotation of the supporting frame 14 and a radiator 15 or gas tank held thereby upon and relative to the depending supporting arm 66 by which the supporting frame 14 is suspended from the pneumatically-operated piston 16 while, at the same time, the frictional engagement between the friction element or friction facing 71 and the disc-shaped steel plate 64 is not sufficient to prevent the supporting frame 14 and a radiator 15 or gas tank held thereby from being manually rotated upon and relative to the depending supporting arm 66 of the pneumatically-operated piston 16.

The construction and arrangement of the parts of the friction clutch device 58 are such that the lower edge portion 80 of the disc-shaped steel plate 59 rides upon the upper ball race or ring 78 of the anti-friction bearing assembly 73, so that when it is desired manually to rotate the supporting frame 14, and a radiator 15 or gas tank held thereby, relative to the depending supporting arm 66 of the pneumatically-operated piston 16, this may be accomplished by grasping the supporting frame 14 and manually rotating the same in a vertical plane. During this operation the weight of the supporting frame 14, and of the radiator 15 or gas tank held thereby, will ride upon the upper edge of the upper ball race or ring 78, whereas the lower edge portion 81 of the disc-shaped steel plate 64, which is attached to the depending supporting arm 66, is disposed above and out of frictional engagement with the upper surface of the upper ball race or ring 78. This arrangement of the parts is, therefore, such that supporting frame 14 and a radiator 15 or gas tank held thereby may be rotated in a vertical plane upon and relative to the depending supporting arm 66 of the piston 16 to enable a radiator 15 or gas tank clamped upon the supporting frame 14 to be submerged, while in a horizontal plane, in the water tank 13 while, at the same time, enabling the supporting frame 14 and the radiator 15 or gas tank held thereby to be manipulated in a horizontal plane to facilitate the mounting of the radiator 15 in the supporting frame 14, as in Fig. 1, and enabling repairs to be made thereon at a repair stand (not shown) which may be arranged adjacent one side or end of the water tank 13.

The manually adjustable clamping devices 51 and 52 on the supporting frame 14 may take various forms but it is preferred that the manually adjustable clamping device 51 be of the screw type which may be manually and gradually adjusted into clamping engagement with one side of the radiator 15, or with one side of an automotive vehicle gas tank, while the other manually-operable clamping device 52 is preferably of the quick-acting type which may be quickly manually moved into and out of clamping engagement with the other side of the radiator 15 or a gas tank clamped in position upon the supporting frame 14.

It will be noted that the check valves 83 permit air to flow through the air supply lines 25 and 29 to the lower and upper air cylinders 21 and 18, respectively. However, when the vertically movable piston 16 and the supporting frame 14 carried thereby are under load, that is, when an automotive vehicle radiator 15, or an automotive vehicle gas tank, is mounted in position and clamped upon the supporting frame 14, the check valves 83 prevent the weight of the then loaded piston 16 and the supporting frame 14 carried thereby from causing the piston 16 to settle downwardly as might otherwise occur if the weight of the loaded piston 16 and supporting frame were free to compress the air in the lower air cylinder 21 and to force the thus compressed air through the air supply line 25, and the manually operable air control valve device 26 and the air supply line 34—33 back into the air compressor (not shown) or, by way of the air supply line 25, branch 32, and the manually operable air control valve device 30 and the air supply line 29 back into the upper air cylinder 18. Both of these possible conditions, which might otherwise develop, and cause settling of the loaded piston 16 and supporting frame 14, are effectively prevented by the air check valves 83.

It will thus be seen from the foregoing description, considered in conjunction with the accompanying drawings, that the present invention provides a new and improved and relatively simple and inexpensive automotive vehicle radiator and gas tank handling apparatus for use in conjunction with repair shops in which repairs on such radiators and gas tanks are made, and that the invention thus has the desirable advantages and characteristics, and accomplishes its intended objects, including those hereinbefore pointed out and others which are inherent in the invention.

I claim:

1. An apparatus for lifting and adjustably supporting a heavy article for inspection and repair, said apparatus comprising a pair of vertically spaced elongated upper and lower cylinders, a fluid actuated piston having an upper and a lower end portion which portions are slidably received in said upper and lower cylinders respectively, a rod connecting said piston portions, said piston being rotatably as well as slidably mounted in said cylinders, an arm member carried by said rod, said arm being rotatable relative to said rod, a frame for supporting the article for inspection and repair, said frame being rotatably mounted on said arm member, a clamp carried by said frame for clamping said article in adjusted position on said frame, a fluid pressure supply line connected to said upper and lower cylinders, and valve means disposed between said fluid pressure line and said cylinders and operable for selectively admitting fluid under pressure to said upper and lower cylinders to reciprocate said piston.

2. An apparatus as claimed in claim 1 wherein said piston is pneumatically actuated, and said arm member comprises a portion which extends substantially parallel to said connecting rod.

3. An apparatus as claimed in claim 1 wherein a friction clutch member is provided for rotatably mounting said frame on said arm member.

4. An apparatus for lifting and adjustably supporting a heavy article for inspection and repair, said apparatus comprising a pair of vertically spaced elongated upper and lower cylinders, a fluid actuated piston having an upper and a lower end portion which portions are slidably received in said upper and lower cylinders respectively, a rod connecting said piston portions, said piston being rotatably as well as slidably mounted in said cylinders, a frame for supporting the article for inspection and repair, said frame being carried by said connecting rod and rotatable relative thereto, means on said frame for fastening said article in adjusted position on said frame, a fluid pressure supply line, conduits connected with said supply line and said upper and lower cylinders respectively, and valve means connecting said supply line to said conduits for selectively admitting fluid under pressure to said upper and lower cylinders to reciprocate said piston.

5. An apparatus as claimed in claim 4 wherein said upper and lower cylinders are air cylinders for pneumatically operating said piston, and wherein check valves are arranged in said conduits to prevent settling of said piston under load conditions.

FREDRICK F. LIETZ.

REFERENCES CITED

The following references are of record in the file of this patent:

UNITED STATES PATENTS

| Number | Name | Date |
|---|---|---|
| 1,354,428 | Worzen | Sept. 28, 1920 |
| 1,432,725 | Nolting | Oct. 17, 1922 |
| 1,823,204 | Long | Sept. 15, 1931 |
| 2,288,076 | Erling | June 30, 1942 |
| 2,399,824 | Pressman | May 7, 1946 |
| 2,505,666 | Franck | Apr. 25, 1950 |